Nov. 2, 1926.  
O. E. BARTHEL  
1,605,384  
OVERHEAD TRUCK FOR CARS  
Filed Dec. 17, 1923  2 Sheets-Sheet 1

Inventor  
Oliver E. Barthel,  
By  
Attorneys

Nov. 2, 1926.  1,605,384
O. E. BARTHEL
OVERHEAD TRUCK FOR CARS
Filed Dec. 17, 1923   2 Sheets-Sheet 2
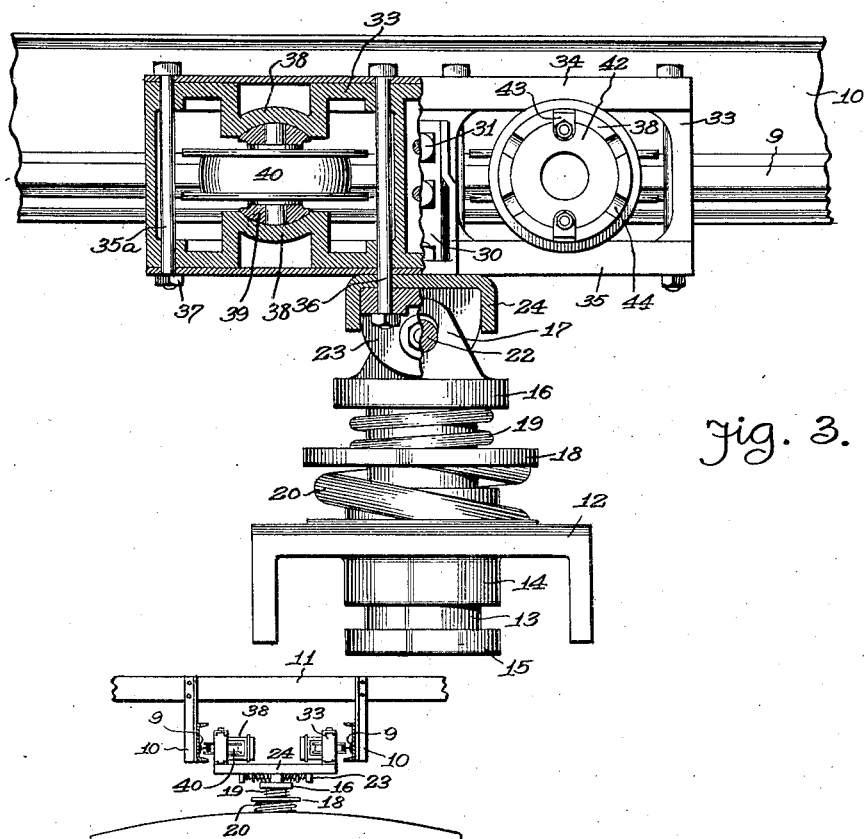
Fig. 3.
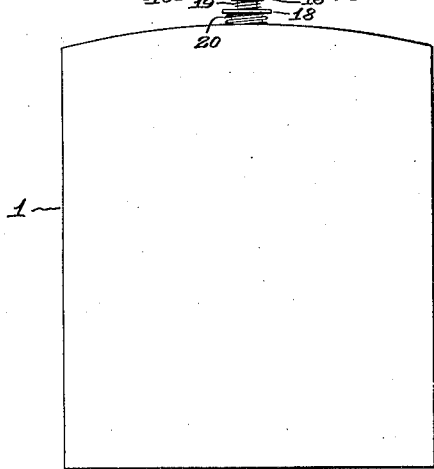
Fig. 4.
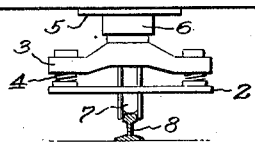
Inventor
Oliver E. Barthel,
Attorney Patented Nov. 2, 1926.

1,605,384

UNITED STATES PATENT OFFICE.

OLIVER E. BARTHEL, OF DETROIT, MICHIGAN.

OVERHEAD TRUCK FOR CARS.

Application filed December 17, 1923. Serial No. 681,107.

This invention relates to a monorail traction system wherein a car or train of cars travel on a single bottom rail and is maintained in approximately an upright position on such rail by a top rail or overhead construction, the same affording means of obtaining power when the car or train of cars is electrically driven, somewhat similar to a trolley traction system.

My invention particularly relates to what may be broadly termed an overhead construction of such a system and the factors of safety flexibility or elimination of noise have entered into my invention to the extent of providing a mechanical construction that will meet such improved requirements. Where passengers are to be transported it is essential that the lives of such passengers be protected, to the highest degree possible, against disastrous wrecks, intentional or accidental, and to insure comfort of such passengers all noises must be reduced to a minimum and the flexibility provided which will insure easy riding of a car or train of cars and consequently an occupant thereof.

Considering the safety factor, I provide an overhead construction which will support a car or train of cars should occasion require. For instance, should the bottom rail or rails, upon which the load of a car is ordinarily supported, be broken, torn up or otherwise displaced to provide a derailment gap, my overhead construction will carry the car over such derailment, gap and thus prevent a wreck. The same is true should a landslide or cave-in displace the bottom rail or rails relative to the overhead construction of my traction system.

Considering the flexibility which is essential to insure comfort of passengers, minimum wear, proper balance of a car or train of cars on the single bottom rail, and self adjustment to curves, grades and irregular lanes of travel, I provide a yieldable overhead construction, which will cooperate with the bottom truck or trucks of a car in at all times supporting the car against sudden shocks and jars which would tend to misaline, stress or strain a car body and rails or tracks supporting or guiding the same. A car is at all times supported in an upright position but in such a manner that the car body will have its vertical, lateral or angular movement cushioned and this is essential when crossings, and curves are encountered.

The shock absorbing devices embodied in the overhead construction of my system not only reduce wear but contribute to a reduction of the noises incident to travel. Springs are introduced at critical points to prevent rattle, binding or misalinement of parts, side swaying and insure tractional engagement of parts at all times, especially when electrical energy is to be distributed for power purposes.

The overhead construction is of such design as to provide plenty of clearance for an electrical collector device that may be a single throttle, a panagraph rail or any other form of current transmission, and the design or arrangement of the overhead construction in providing safe and rapid transit anywhere.

Other advantages of my invention will be brought out during an explanation of the construction entering into my invention, and reference will now be had to the drawings, wherein—

Fig. 3 is a cross sectional view of the upper truck or overhead construction, partly in elevation, and Fig. 4 is a diagrammatic end view of a monorail car in accordance with my invention.

Figure 1:
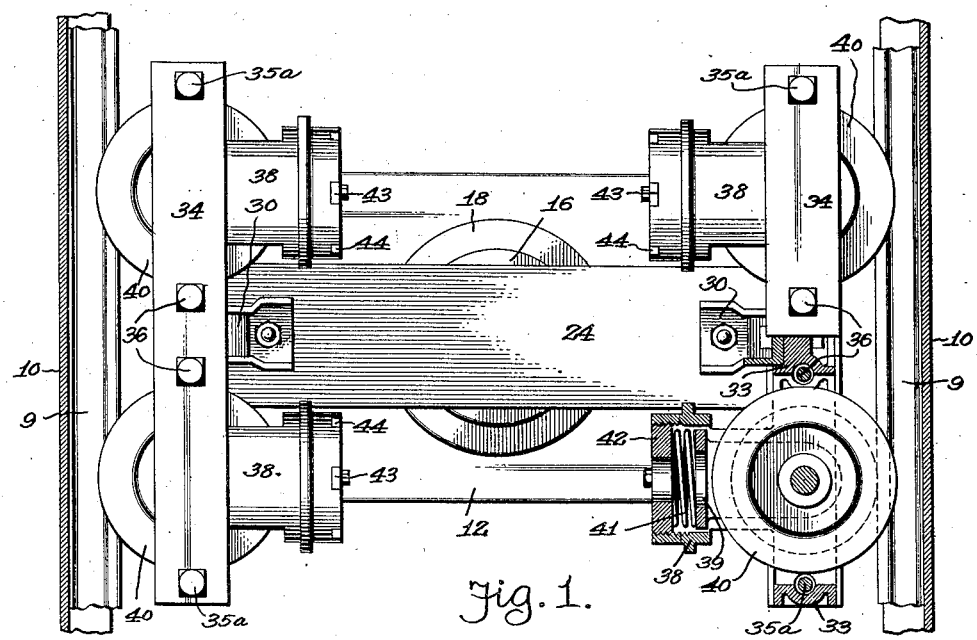
Figure 1 is a plan of the upper truck or overhead construction of a car intended for a monorail traction system.
Figure 2:
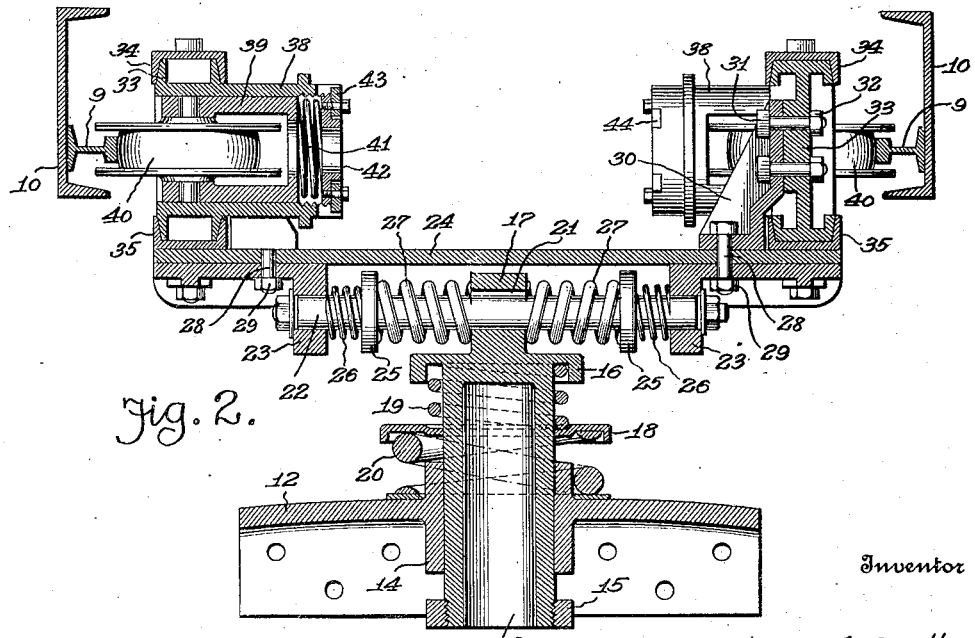
Fig. 2 is a longitudinal sectional view of the same.

Before referring to the details of construction reference will be had to Fig. 4 showing a car body 1 supported between upper and lower trucks, the lower truck being designated 2 and including a bolster 3, bolster springs 4, a lower center bearing 5, a king pin 6, and one or more wheels 7 adapted to travel on a single rail 8. This lower truck forms no part of the present invention other than contributing to the operation of rolling stock or a lower movable support of a car body 1. Any number of lower trucks may be employed and the same is true of the upper truck, which is adapted to travel between opposed parallel rails 9 carried by the confronting faces of channel side members 10. These channel side members may form part of an overhead structure or framework and said side members are spaced apart a sufficient distance to permit of a comparatively wide upper truck being used on the car body, so that the car body will be more firmly held or braced against side swaying than if the side members were pushed together. In other words, side loads on the car body will not subject the side members to so great a strain as if the side members were close together or a single rail provided for the upper truck. Then again, there is that advantage of the side members supporting bridges 11 or suitable supports for one or more trolley wires, rails or conductors with plenty of space between the side members for any type of current collector, as one or more trolley poles.

The upper truck may be located directly above the lower truck and in some instances the lower center bearing 5 or the king pin 6 may be connected to an upper center bearing 12 and an upper king pin 13, but I prefer to depend on the framework of the car body 1 as a connection between the upper and the lower center bearings and allow independent movement of the upper and lower king pins.

Considering the detail construction of the upper truck reference will be had to Figs. 1 and 3 showing the upper center bearing 12 and the king pin 13 previously referred to. The center bearing is preferably channel shaped with a tubular guide 14, intermediate its ends, for the king bolt or pin 13, which is preferably hollow, and has its lower end exteriorly screwthreaded for a nut or collar 15 serving as a stop against the lower end of the guide 14 to limit the upward movement of the king pin relative to the center bearing. Besides the king pin being reciprocable in its guide or the guide reciprocable on the pin there is a rotary movement permitting the center bearing turning about the king pin or the king pin turning in a bearing.

On the upper end of the king pin 13 is a head 16 provided with a central apertured lug 17, and between the head 16 and the guide 14 is a movable head 18 which surrounds the king pin and affords seats for a main spring 19 and a reserve spring 20. The main spring 19 encircles the king pin between the heads 16 and 18 and the reserve spring 20 is between the head 18 and the center bearing 12, said reserve spring being heavier than the main spring so that the reserve spring will not be brought into action until the main spring has been more or less compressed.

The lug 17 has an oblong opening 21 for a transversely disposed trunnion member 22 in the form of a shaft or rod which has its ends held by angle brackets 23 set in the ends of a channel center plate 24. On the trunnion member 22 are heads or spacers 25 and between the brackets 23 and the heads 25 are main springs 26, while between the heads 25 and the lugs 17 are reserve springs 27. All of these springs cooperate in holding the brackets 23 equidistant relative to the king pin 13, but when occasion requires the opening 21 in the lug 17 will permit of a sidewise movement of the lug, either in a plane parallel to the center plate 24 or in an arc having for its center the ground rail 8. In no instance can the lug 17 bind against the trunnion member 22 and the heavy or reserve springs 27 are employed for shock absorbing purposes, while the main springs 26 perform lighter duties, especially that of insuring contact between the brackets 23, springs 26, heads 25, springs 27 and lug 17. The springs 26 will cushion sidewise or tilting movement of the car body relative to the center plate 24, until such movement becomes excessive or greater than the compression force when the heavy duty or reserve springs 27 are brought into action. When the springs 26 and 27 at one side of the lug 17 are fully compressed on account of the car body swaying to one side, the springs on the opposite side of the lug are not fully expanded, thus preventing any noise incident to metallic parts contacting, when the car body swings to the opposite side.

Secured to the ends of the center plate 24 by bolts 28 and nuts 29 or other fastening means are brackets 30 and attached to said brackets by bolts 31 and nuts 32 are longitudinal frames 33 which are disposed in parallelism at the outer ends of the center plate, said frames having the upper and lower edges thereof inclosed by channel bars 34 and 35 which are held in place by tie rods 35ª and 36 provided with nuts 37. The tie rods 36 extend through the center plate 24 and the brackets 23, as best shown in Fig. 3, thus cooperating with the brackets 30 in positively anchoring the frames 33 relative to the center plate.

The frames 33 are identical in construction and adjacent each end of each frame is a cylindrical housing 38 disposed at a right angle to the frame with its outer end flush with the outer face of the frame and its inner end projecting inwardly from the inner face of the frame. Slidable and rotatable in each housing is a yoke 39 and journaled in the yoke is a horizontally disposed double flanged wheel 40 having a convex periphery which engages the rail 9 with one of the flanges above the rail and the other below the rail, so that the wheel 40 has a limited vertical movement relative to the rail.

The yoke 39 is spring pressed by a coiled retractile spring 41 mounted in the inner end of the housing 38 and retained therein by a tension regulator 42 screwed in the inner end of the housing, said tension regulator being held against displacement by detachable lugs 43 extending into notches 44 of which there is a series in the inner end of the housing. The tension regulator, as well as the yoke permit of the journal of the wheel 40 and the bearing surfaces of the housing 38 being lubricated.

Considering the advantages gained by my construction four horizontally disposed wheels are used in preference to two wheels, for if two wheels are employed there is a danger of binding if all parts do not move easily and momentarily. One wheel is liable to lag behind and put an undue strain on the truck. In employing four wheels an equalizing effect is obtained which will prevent any kind of binding and cause all four wheels to follow the rails, always maintaining the same diagonal distance between diagonally disposed wheels. If one or more wheels would have a tendency to stick, the other wheels would force the sticking wheels ahead and prevent lagging, since all of the wheels are in the same overhead structure.

To compensate for any wear on the flanges of the wheels 40 or any variations in the distance between the rails, the wheels are pressed against the rails by the springs 41 engaging the yokes 39. The springs are of small capacity so as to reduce the pressure against the rails, yet insure a contact under all running conditions. Besides the wheels 40 being yieldably held said wheels have a tilting action due to the yokes 39 being rotatable in the housings 38. In going over a curve in the vertical plane of the traction system, the wheels 40 may have a tendency to bind with the flanges thereof on the rails 9, but this is overcome by permitting the yokes to oscillate and adjust themselves to any curvature of the rails. It is by virtue of the tension regulators 42 that the yokes 39 may be advanced in the housings 38 to compensate for wear, and when new wheels are installed the yokes 39 may be retracted.

Considering the manner in which the center plate is supported, it is obvious that the car body may adjust itself relative to the upper truck. Should there be side swaying of the car body such movement is permitted by the opening 21 of the king pin, but such movement is resisted first by the main springs 26 and then by the reserve springs 27, these springs being for heavy duty to prevent any sudden shocks or jars which would make riding uncomfortable in the car body and cause considerable noise. The springs 19 and 20 are used for practically the same purpose in connection with the king pin, which is normally elevated relative to the center bearing and should the car body be raised relative to the rails 9 the springs will cushion such movement. The main spring 19 will at all times hold the king pin in engagement with the trunnion member 22 and there can be no rattle or noise of any consequence in connection with the overhead truck.

The upper truck being comparatively wide permits of the center plate being provided with any electrical collecting device and since some support must be provided for the side members 10, it is obvious that such support may hold trolley wires or rails to be engaged by the device on the center plate 24.

It is thought that the operation and utility of my invention will be apparent without further description, and while in the drawings, there is illustrated a preferred embodiment of my invention, it is to be understood that the structural elements are susceptible to such variations and modifications as fall within the scope of the appended claims.

What I claim is:—

1. In a railway traction system, a car body adapted to travel on a ground rail, overhead rails, and an overhead truck for said car body which supports said car body on said overhead rails when said car body is off of said ground rail.

2. A railway traction system as in claim 1, wherein said overhead truck includes horizontally disposed double flanged wheels.

3. A railway traction system as in claim 1, wherein said overhead truck is supported for self adjustment relative to said car body.

4. A railway traction system as in claim 1, wherein said overhead rails are wide apart with said overhead truck therebetween and of sufficient width to provide clearance for an electrical collector device.

5. An overhead truck for cars comprising a rotary and reciprocable king pin, a center plate trunnioned thereon and adapted to laterally shift relative to said king pin, springs at the trunnion of said center plate to resist such lateral shifting, and horizontally disposed wheels supported from the ends of said center plate and adapted to engage opposed rails.

6. An overhead truck for cars comprising a rotary and reciprocable king pin, a center plate journaled thereon, and horizontally disposed wheels supported from the ends of said center plate and adapted to engage opposed rails, said wheels being tiltable and yieldably held relative to said center plate.

7. In a monorail system of traction, a car body having a lower truck movable on a ground rail, overhead rails, an upper truck having a plurality of wheels engaging said rails, and means connecting said upper truck to said car body so that said upper truck may tilt and vertically and laterally move.

8. An overhead construction for railway cars comprising a tiltable truck, individually yieldable horizontally disposed rail engaging wheels carried by said truck, and tension regulating devices controlling the yieldingness of said wheels.

9. An overhead construction for railway cars comprising a truck, yieldable horizontally disposed wheels on said truck, and means supporting each wheel so that it may tilt at an angle to said truck.

10. An overhead construction as in claim 9 wherein each wheel is supported in a rotatable yoke.

11. An overhead car truck comprising a center plate, frames on the ends of said plate, wheels supported from said frames, and yieldable yokes supporting said wheels relative to said frames.

12. An overhead car truck as in claim 11, wherein springs engage said yokes, and devices are adapted to regulate the tension of said springs.

13. The combination of a car body, a truck above said body, a connection between said truck and car body, said connection permitting vertical and lateral movement of said truck relative to said car body, and means at said connection adapted to resist such movement.

14. The combination set forth in claim 13, wherein said means includes light duty springs eliminating rattle in said connection, and heavy duty springs serving as shock absorbers.

15. The combination of a car body, a truck above said car body, a reciprocable king pin in said car body, a trunnion supporting said truck on said king pin and laterally shiftable in said king pin, and means on said trunnion to resist lateral shifting thereof.

16. In a monorail system of traction, a ground rail, overhead rails, a car body, a lower truck, an upper truck, said trucks engaging said rails and supporting said car body, and a connection between said car body and the upper truck adapted to cushion a swaying movement of said car body.

17. A system of traction as in claim 16 wherein said connection includes cushioning means for a vertical movement of said car body relative to said truck.

18. In a monorail system, a lower supporting rail, upper spaced apart substantially parallel guiding rails, a monorail car supported for travel upon said lower rail provided with a pivotally supported guiding wheel truck capable of tilting movement relative to the car and having on each side a plurality of horizontally disposed guiding wheels adapted to engage the guiding rails, said wheels tiltable in a horizontal plane and so mounted as to yieldingly accommodate themselves to variations in the gauge between the rails.

19. In a monorail car, a pivotally supported guiding wheel truck positioned thereabove extending crosswise the car and having a pair of guiding wheels mounted at each end disposed in a horizontal plane, means for exerting yielding tension on said wheels tending to hold them against stationary guiding rails, means for regulating said tension.

20. In a monorail system having stationary oppositely disposed guiding rails, a monorail car provided with guiding wheels adapted to form yielding travelling engagement with said guiding rails, said wheels tiltable from their normal plane.

21. A monorail car on the top of which is pivotally mounted a guiding wheel truck capable of movement vertically and transversely relative said car and tiltable from its normal horizontal plane.

22. A monorail car pivotally supported on a lower wheel truck and having a pivotally supported overhead wheel truck capable of yieldingly restrained independent vertical and lateral movement relative said car and yieldingly tiltable in a vertical plane relative said car.

23. The combination with a monorail car of a pivotally supported overhead guiding wheel truck comprising a truck frame pivoted as a unit for relative rotary movement, and so mounted on the car as to have a yieldingly restrained lateral and vertical movement relative said car.

In testimony whereof I affix my signature.

OLIVER E. BARTHEL.